June 24, 1930. A. S. WELLS 1,766,235
TOOTH HOLDING DEVICE
Original Filed March 31, 1926
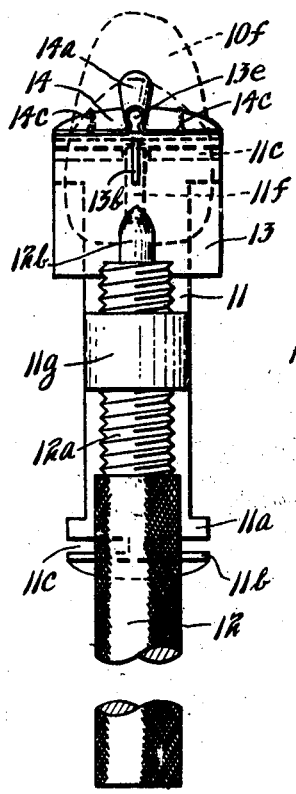
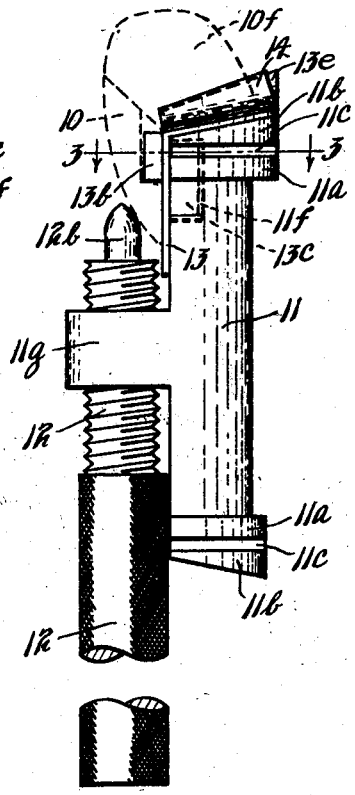
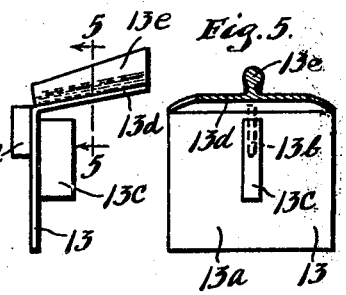
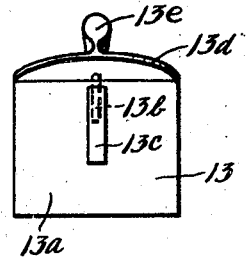
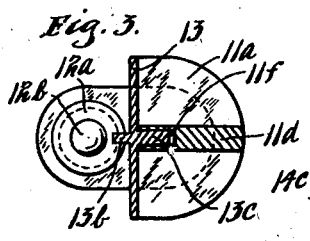
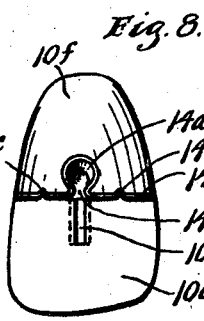
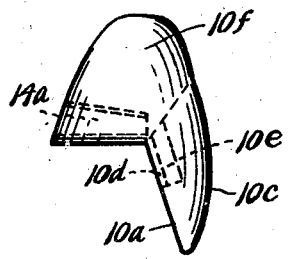
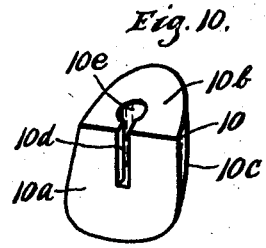
INVENTOR
AMOS S. WELLS.
BY HIS ATTORNEYS Patented June 24, 1930

1,766,235

UNITED STATES PATENT OFFICE

AMOS S. WELLS, OF MINNEAPOLIS, MINNESOTA

TOOTH-HOLDING DEVICE

Application filed March 31, 1926. Serial No. 98,919. Renewed July 26, 1929.

This invention relates to a dental tool and particularly to a tool for holding an artificial tooth facing while the tip portion of the tooth is formed or built up thereon. Said tooth facings are now sold as commercial articles and the tips are built up thereon by the dentist, to fit the teeth cavities of the patient. Said facings are provided with various means by which they can be held, some having pins projecting from the rear flat surface thereof and others being provided with a recess in said surface. It is also a common practice to have a base or form of metal at the bottom of the porcelain tip which is built onto the facing and it is desirable to have a tool for holding this base or form.

It is an object of this invention, therefore, to provide a dental implement adapted to easily and conveniently hold a tooth facing having a recess formed therein.

It is a further object of the invention to provide a dental implement having means for holding the tooth facing with a recess therein and which implement has a surface adjacent the facing held therein on which the tip portion may be built up.

It is another object of the invention to provide a dental implement having means for holding a tooth facing and having a surface adjacent said facing so held therein on which the tip is adapted to be built up, which surface has means thereon for holding a base or form for said tip.

It is still another object of the invention to provide a dental implement for holding a tooth facing having a recess therein provided with means adapted to enter said recess and to engage the wall thereof to hold said facing.

It is still another object of the invention to provide an attachment for a dental implement such as the implement disclosed and claimed in applicant's co-pending application, S. N. 52,789, filed August 27, 1925, which attachment is adapted to hold a tooth facing with a recess therein, and also preferably with means for holding a tip form or base.

It is still further an object of the invention to provide a novel form or base for a tip facing.

These and other objects and advantages of the invention will be fully set forth in the following description made in connection with the accompanying drawings, in which like reference characters refer to similar parts throughout the several views and in which:—

Fig. 1 is a view in front elevation of the device;

Fig. 2 is a view as seen from the right of Fig. 1, said views having the tooth facing and tip thereof indicated in dotted lines;

Fig. 3 is a horizontal section taken on line 3—3 of Fig. 2 as indicated by the arrow;

Fig. 4 is a view in side elevation of the device adapted to form an attachment for the implement shown in Figs. 1 and 2;

Fig. 5 is a vertical section taken on line 5—5 of Fig. 4 as indicated by the arrow;

Fig. 6 is a view in rear elevation of the device shown in Fig. 4;

Fig. 7 is a perspective view of the base or form for a tip;

Fig. 8 is a rear view of the tooth facing having the tip built thereon carrying the base or form shown in Fig. 7;

Fig. 9 is a view of the device shown in Fig. 8 as seen from the right thereof, and Fig. 10 is a perspective view of a form of tooth facing used.

Referring to the drawings, one common use of the tooth facing now on the market is shown in Fig. 10. This comprises a member 10 having the rear flat surface $10^a$, the top surface $10^b$ extending at an angle to surface $10^a$ and the front rounded portion $10^c$ extending from surface $10^b$ to the edges of the surface $10^a$. The member 10 has a recess formed therein comprising a portion $10^d$ having parallel sides and which is substantially rectangular in cross section and with the inner enlarged portion $10^e$ which, in the embodiment of the invention illustrated, is shown as substantially cylindrical. Such tooth facings are used in making the artificial teeth and have a tip indicated as $10^f$ in Figs. 1, 2, 7 and 8 built thereon on a surface $10^b$. The tooth facing shown in Fig. 10 is adapted to be held in the implement shown in Figs. 1 and 2. The implement shown is in a part substantially the same as disclosed in applicant's copending application above referred to, which comprises a substantially semi-cylindrical body or retaining portion 11 having one flat surface with a projecting threaded lug $11^g$ through which extends the screw portion $12^a$ of the operating member or handle 12. The portion $12^a$ has a reduced portion $12^b$ at its upper end having a rounded and substantially pointed end. The body portion 11 has enlarged portions $11^a$ at each end having a flat terminal surface $11^b$ extending at an angle to the longitudinal axes of the members 11 and 12. Below the surfaces $11^b$ member $11^a$ is provided with a pair of inwardly extending slots $11^c$ having their inner ends separated by a rib $11^d$. Another slot $11^f$ extends into the flat surface of member 11 at one end of the same closely adjacent one surface $11^b$, a considerable distance toward the lug $11^a$, said groove extending through the central rib $11^d$.

The implement shown in Figs. 1 and 2 has means at its top for holding the tooth facing shown in Fig. 10 and while this means can be made integral with the implement described, in the embodiment of the invention illustrated the means is shown as separate. This means comprises a member 13. The member 13 comprises a thin plate $13^a$ having a portion $13^b$ projecting from the front side thereof, which portion forms means for entering the recess in the tooth facing 10. While this portion might be variously formed to engage in and be held in said recess, in the embodiment of the invention illustrated it is shown as a projecting rib rectangular in outline and cross section, and having its top surface substantially flush with the lower portion of the top surface of member 13. The plate portion $13^a$ has another rib $13^c$ projecting from its rear side, which rib also is rectangular in its outline and cross section. Above rib $13^c$ the member 13 has a rearwardly and upwardly inclined plate portion $13^d$ having a rear rounded edge as shown in Fig. 6 having a flat top surface from which surface projects a means adapted to hold a base or form on the tooth tip. While this means could be variously made, in the embodiment of the invention illustrated it is shown as a rib $13^e$ extending longitudinally substantially centrally of the top surface of the portion $13^d$ and having a contracted lower portion and an enlarged upper portion illustrated as substantially cylindrical, said rib tapering in height from its rear end toward the forward end of member 13 or toward the plate portion $13^a$. The member 13 is adapted to be received and held on the implement shown in Figs. 1 and 2 as indicated in said figures. The rear surface of portion $13^a$ abuts against the flat surface of the body 11, the rib $13^c$ enters the slot $11^f$ and the bottom flat surface of the top portion $13^d$ lies flat on the surface $11^b$.

The rib $13^e$ is arranged to be embraced by the plate or form used at the bottom of the tip portion. Such a plate or base is shown in Figs. 7 to 9. The same comprises a thin metal plate 14 bent at its center to form the tapered or frusto-conical sleeve $14^a$ which sleeve has a narrow or reduced opening $14^b$ at its bottom portion. The plate 14 may also be provided with projections on its top surface and while these projections may take various forms, in the embodiment of the invention illustrated they are shown as a pair of ribs $14^c$ extending longitudinally of said top surface and parallel to the axis of sleeve $14^a$.

In operation, when the tooth facing such as shown in Fig. 10 is to be used, and a tip built thereon, member 13 will be disposed on the implement, comprising the body 11 as shown in Figs. 1 and 2. The facing 10 will now be disposed with its rear flat side $10^a$ against the outer surface of plate $13^a$ and with the recess therein receiving the rib $13^b$. The stem or handle 12 will now be screwed upwardly until the point $12^h$ engages the forward rounded portion $10^c$ of the facing 10. Said facing will then be firmly held against the outer surface of portion $13^a$ of the member 13, the bottom edge of rib $13^b$ contacting the bottom wall of the recess in said facing. The surface on top of the portion $13^d$ of the member 13 is now disposed in the proper position to have the top $10^f$ built up thereon. In practice the base or form 14 shown in Fig. 7 is used for the tip. If the said base or form is to be left on the tooth, the same is made from the plate about 12/1000ths of an inch in thickness. If the base or form is to be removed after the tip is built up, the same will be made of a thickness of approximately 2/1000ths of an inch in thickness. The base is placed on top of the portion $13^d$ by sliding the same upwardly on said portion from the front, with the sleeve $14^a$ embracing the rib $13^e$. The form is constructed and arranged to fit snugly and tightly on the rib $13^e$ with its front edge substantially flush with the front edge of said rib. The tip may now be built up on the form 14 into the shape indicated in Figs. 1, 2, 8 and 9. When the tip is so built up, the stem 12 can be lowered and the facing 10 and tip together with the form 14 can be removed from the implement by merely sliding the same forwardly and downwardly parallel to the portion $13^d$. The tip is now baked so as to be hardened. There is some contraction of the porcelain in this baking operation and if the form is to be left in a tooth it is made thicker, so that it will not be distorted by the contraction of the porcelain which adheres thereto. The tip is thus now formed and securely united to the facing and is ready for further operations.

From the above description it is seen that applicant has provided a very simple and efficient implement for holding a tooth facing having a recess therein and for holding a base or form of a tip which is applied to said facing. The facing is very securely held on the implement and all parts are retained securely therein until the time for removing the facing and tip. When the device is constructed as illustrated, the member 13 forms an attachment for the implement and the implement can still be used to hold teeth facings having the pair of projecting pins as disclosed in applicant's co-pending application supra. A universal implement is thus provided.

The device is quite simple and can be easily and inexpensively made and the same is very easily and quickly manipulated and operated. The device has been amply demonstrated in actual practice and found to be very successful and efficient.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:

1. A tool for supporting a tooth facing with a recess therein, having in combination, a pair of adjustable retaining members adapted to hold said tooth facing, one of said members having a portion adapted to enter said recess in the facing and having a supporting surface extending at one side of said facing on which the tip may be built up.

2. A dental implement for use in building up a tip on an artificial tooth, which tooth has a recess therein having in combination, retaining means for holding said tooth, including a portion adapted to enter said recess and a supporting surface extending transversely at one side of said tooth when held in said tool, on which surface a tip may be built up.

3. A dental implement for holding a tooth having a recess therein, for building a tip thereon, having in combination, means against which the tooth abuts, means entering said recess and engaging the end thereof and means for moving said tooth longitudinally into position to clamp said tooth, with said last mentioned means, against one end of said recess.

4. A dental implement for holding a tooth having a recess therein, for building a tip thereon, having in combination, means against which the tooth abuts, and holding means having a portion thereof engaging the wall of said recess to hold the tooth in position, said device having a surface extending laterally from said tooth when held in said implement on which surface the tip is built.

5. A dental implement for holding a tooth facing on which the tip is to be built up having in combination, retaining means for said tooth, and means having a supporting surface extending transversely at one side of said tooth, said surface having means thereon adapted to be engaged by a form at the bottom of said tip.

6. A dental implement for holding a tooth facing on which a tip is to be built up having in combination, retaining means for holding said tooth facing, means having a supporting surface extending at one side of said tooth facing on which the tip is built and a locking member on said surface adapted to engage in a groove in a tip form.

7. A dental implement for holding a tooth facing on which the tip is to be built up having in combination, retaining means for said tooth, means having a surface extending at one side of said tooth, and means on said surface for interlocking with a base member on a tip.

8. A dental implement for holding a tooth facing having a flat side and a portion on which the tip is to be built up having in combination, retaining means for said tooth, means having a surface extending at one side of said tooth and at an angle to said flat side, and slidably detachable holding means on said surface adapted to slidably engage a removable tip form or base.

9. A dental implement for holding a tooth facing on which the tip is to be built up having in combination, retaining means for said tooth, means having a surface extending at one side of said tooth, and means for holding a tip base on said surface separable by a sliding movement of said base substantially parallel to said surface.

10. A dental implement for holding a tooth facing on which the tip is to be built up having in combination, retaining means for said tooth, means having a surface extending at one side of said tooth, said surface having a tapered rib thereon adapted to be engaged by a form on the base of said tip.

11. A dental implement for holding an artificial tooth having a flat surface and a recess extending from said surface, having in combination, a member having a flat surface against which said surface of the tooth abutts, a rib projecting from the surface of said member adapted to enter said recess and engaging the end thereof and means engaging the outer curved side of said tooth and movable in the direction longitudinally of said rib to clamp the same against said surface and rib with said rib engaging the end of said recess.

12. A tool for supporting an artificial tooth, said tooth having a flat surface with a recess extending therein having in combination, a member having means adapted to enter said recess in said tooth and having a supporting surface extending at an obtuse angle to said surface on which supporting surface a tip may be built up.

13. A dental implement for use in building up a tip on an artificial tooth, which tooth has a flat surface and a recess extending therein, comprising a member adapted to contact said surface of the tooth and having means adapted to enter said recess in said tooth, said member also having a surface extending at an angle to said surface of the tooth adapted to support a tip, said latter surface having means projecting therefrom, about which the tip is built.

14. An implement for supporting a tooth facing, which facing has a recess therein comprising a member having a surface against which the rear of said tooth facing engages, means constructed and arranged to enter said recess in said facing, and a member arranged to engage the outer curved surface of said facing, and means for moving said member longitudinally of said recess to move said facing to cause said first mentioned means to engage the end of said recess and clamp said facing against said surface of said first mentioned member.

In testimony whereof I affix my signature.

AMOS S. WELLS.